United States Patent
Chetlur et al.

(10) Patent No.: US 8,661,479 B2
(45) Date of Patent: Feb. 25, 2014

(54) CACHING LARGE OBJECTS WITH MULTIPLE, UNKNOWN, AND VARYING ANCHOR POINTS AT AN INTERMEDIARY PROXY DEVICE

(75) Inventors: Malolan Chetlur, Bangalore (IN); Umamaheswari C. Devi, Bangalore (IN); Shivkumar Kalyanaraman, Bangalore (IN); Robert Bruce Nicholson, Haryana (GB); Ramana V. Polavarapu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 13/236,175

(22) Filed: Sep. 19, 2011

(65) Prior Publication Data
US 2013/0074136 A1    Mar. 21, 2013

(51) Int. Cl.
*G06F 13/00* (2006.01)
*G06F 13/28* (2006.01)
*H04N 7/173* (2011.01)

(52) U.S. Cl.
USPC ................ 725/86; 725/87; 725/88; 725/89; 725/95; 711/100; 711/130; 711/133; 711/136

(58) Field of Classification Search
USPC ....................................................... 725/148
See application file for complete search history.

(56) References Cited

U.S. PATENT DOCUMENTS

| | | | |
|---|---|---|---|
| 5,414,455 A | 5/1995 | Hooper et al. | |
| 5,586,264 A | 12/1996 | Belknap et al. | |
| 5,787,472 A | 7/1998 | Dan et al. | |
| 6,463,508 B1* | 10/2002 | Wolf et al. | 711/133 |
| 7,251,649 B2 | 7/2007 | Shen et al. | |
| 7,814,221 B1 | 10/2010 | Fox | |
| 7,930,706 B1 | 4/2011 | Walsh et al. | |
| 2002/0029282 A1 | 3/2002 | Buddhikot et al. | |
| 2002/0103928 A1 | 8/2002 | Singal et al. | |
| 2005/0066063 A1 | 3/2005 | Grigorovitch et al. | |
| 2007/0239882 A1* | 10/2007 | Lai et al. | 709/231 |
| 2009/0254707 A1 | 10/2009 | Alstad | |
| 2010/0281112 A1 | 11/2010 | Plamondon | |

(Continued)

FOREIGN PATENT DOCUMENTS

| | | |
|---|---|---|
| EP | 2466870 A1 | 6/2012 |
| WO | 2004046968 | 6/2004 |

OTHER PUBLICATIONS

Wu, Kun-Lung, et al., "Segmentation of Multimedia Streams for Proxy Caching", IEEE Transactions on Multimedia, Oct. 2004, pp. 770-780, vol. 6, No. 5, IEEE, New York, New York, USA.

(Continued)

*Primary Examiner* — Justin Shepard
(74) *Attorney, Agent, or Firm* — Ference & Associates LLC

(57) ABSTRACT

Methods and arrangements for caching video object portions. A request for stand-alone content in a video object is received, the content neither being cached nor being adjacent to a cached video object portion, and a first portion of the video object is cached. A value is assigned to the first video object portion. A subsequent request for content in the video object is received, the subsequent request corresponding to access to the first video object portion and a second, uncached portion of the video object. The value of the first video object portion is updated. For the second video object portion, an amount to cache and a value are determined.

10 Claims, 6 Drawing Sheets

(56) References Cited

U.S. PATENT DOCUMENTS

2010/0281509 A1   11/2010   Yu et al.
2011/0023080 A1*   1/2011   Drang et al. ................... 725/148
2012/0147865 A1*   6/2012   Pothula et al. ................ 370/338

OTHER PUBLICATIONS

Chen, Songqing, et al., "Segment-Based Proxy Caching for Internet Streaming Media Delivery", 7th International Workshop on Multimedia Signal Processing, Oct. 30-Nov. 2, 2005, pp. 59-67, IEEE Computer Society, Los Almamitos, California, USA.

Hefeeda, Mohamed, et al., "Traffic Modeling and Proportional Partial Caching for Peer-to-Peer Systems", IEEE/ACM Transactions on Networking, Dec. 2008, pp. 1447-1460, vol. 16, No. 6, IEEE, New York, New York, USA.

Chen, Songqing, et al., "Segment-Based Streaming Media Proxy: Modeling and Optimization", IEEE Transactions of Multimedia, Apr. 2006, pp. 243-256, vol. 8, No. 2, IEEE, New York, New York, USA.

Yu, Jiang, et al., "Internal popularity of streaming video and its implication on caching", Proceedings of the 20th International Conference on Advanced Information Networking and Applications, Apr. 18-20, 2006, 6 pages, IEEE Computer Society, Vienna, Austria.

Liu, Jiangchuan et al., "Proxy caching for media streaming over the Internet," Abstract only, IEEE Communications Magazine, Aug. 2004, 1 page, IEEE Xplore Digital Library.

Search Report, Dec. 19, 2012, 5 pages, Intellectual Property Office, Concept House, Cardiff Road, Newport, South Wales, Great Britain.

* cited by examiner

CACHING LARGE OBJECTS WITH MULTIPLE, UNKNOWN, AND VARYING ANCHOR POINTS AT AN INTERMEDIARY PROXY DEVICE

BACKGROUND

Generally, wireless and mobile broadband and video traffic has increased tremendously in recent years. This trend has no signs of abating, while challenges continually present themselves in handling the growing traffic. A limited wireless spectrum and an inadequate wireless backhaul infrastructure represent but examples of the hindrances. As such, 3G wireless network operators continually are seeking optimizations that can help in deferring infrastructure upgrades.

One simple and effective method to reduce the backhaul traffic is to cache frequently requested content at proxies at the edge elements, such as base stations (BS), of a wireless network. However, traditional full-object caching policies may not be effective for Video-on-Demand (VoD) and other types of multimedia traffic. This is because video objects tend to be much larger in size than traditional web objects, and the number of video clips in general keeps increasing by the day. More specifically, since video objects are very large, if cached in entirety, the caching of wrong objects can significantly deteriorate performance. Caching in entirety can also hinder performance, since in many cases videos tend to be viewed by a user only partially. Additionally, a video can have multiple anchor points or regions, including many that do not begin at the first byte of the video. As such, storing a prefix of the video will not always be optimal (wherein an anchor point or region is a video portion around which viewing tends to be heavy). Finally, the anchor points may be only approximate and unknown ahead of time, and would need to be determined based on user accesses. For the above-stated reasons and more, challenges have often been encountered in determining which portions to cache of a large object that may be accessed from any offset and for any length, not necessarily from the beginning or until the end. Solutions continue to be elusive, and have performed poorly for objects that have multiple anchor points, or anchor points that do not begin at the first bytes and which are unknown ahead of time.

BRIEF SUMMARY

In summary, one aspect of the invention provides a method comprising: receiving a request for stand-alone content in a video object, the content neither being cached nor being adjacent to a cached video object portion; caching a first portion of the video object; assigning a value to the first video object portion; receiving a subsequent request for content in the video object, the subsequent request corresponding to access to the first video object portion and a second, uncached portion of the video object; updating the value of the first video object portion; and determining, for the second video object portion, an amount to cache and a value.

Another aspect of the invention provides an apparatus comprising: at least one processor; and a computer readable storage medium having computer readable program code embodied therewith and executable by the at least one processor, the computer readable program code comprising: computer readable program code configured to receive a request for stand-alone content in a video object, the content neither being cached nor being adjacent to a cached video object portion; computer readable program code configured to cache a first portion of the video object; computer readable program code configured to assign a value to the first video object portion; computer readable program code configured to receive a subsequent request for content in the video object, the subsequent request corresponding to access to the first video object portion and a second, uncached portion of the video object; computer readable program code configured to update the value of the first video object portion; and computer readable program code configured to determine, for the second video object portion, an amount to cache and a value.

An additional aspect of the invention provides a computer program product comprising: a computer readable storage medium having computer readable program code embodied therewith, the computer readable program code comprising: computer readable program code configured to receive a request for stand-alone content in a video object, the content neither being cached nor being adjacent to a cached video object portion; computer readable program code configured to cache a first portion of the video object; computer readable program code configured to assign a value to the first video object portion; computer readable program code configured to receive a subsequent request for content in the video object, the subsequent request corresponding to access to the first video object portion and a second, uncached portion of the video object; computer readable program code configured to update the value of the first video object portion; and computer readable program code configured to determine, for the second video object portion, an amount to cache and a value.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
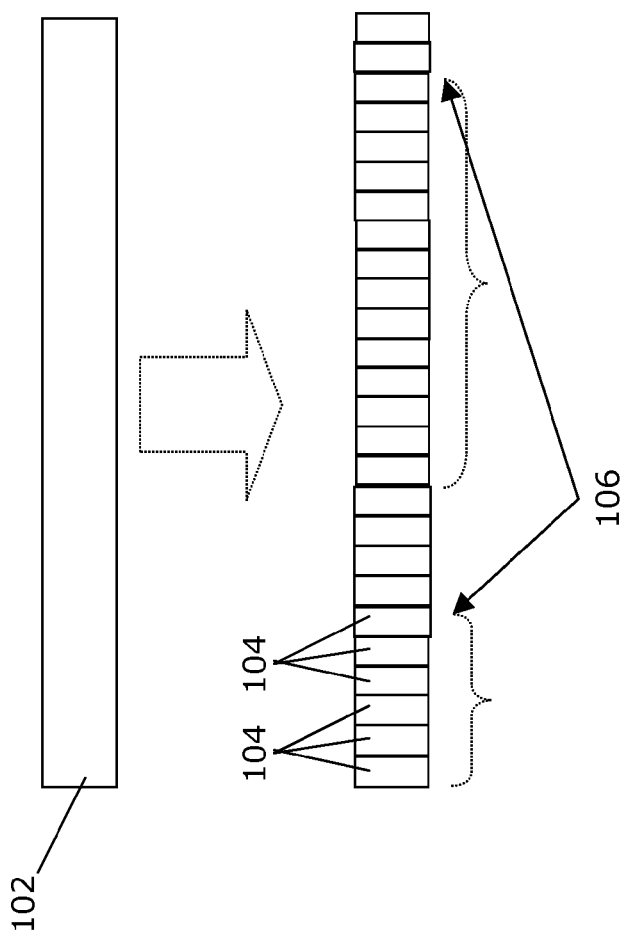
FIG. 1 shows a video object and constituent divisions.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIGS. 1-4. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 6 whether on a server computer, a client computer, a node computer in a distributed network, or any combination thereof.

Figure 2:
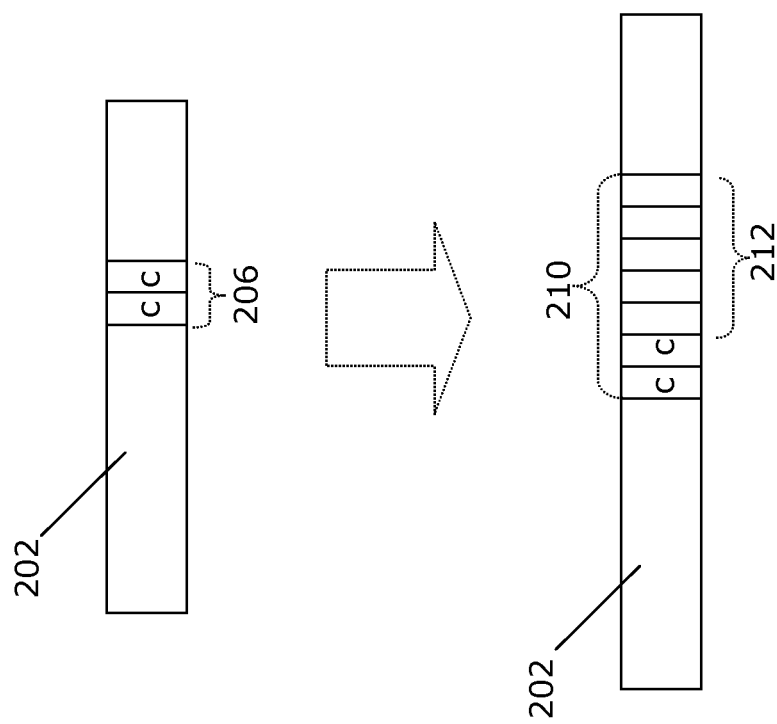
FIG. 2 shows a video object with a cached segment.
Figure 3:
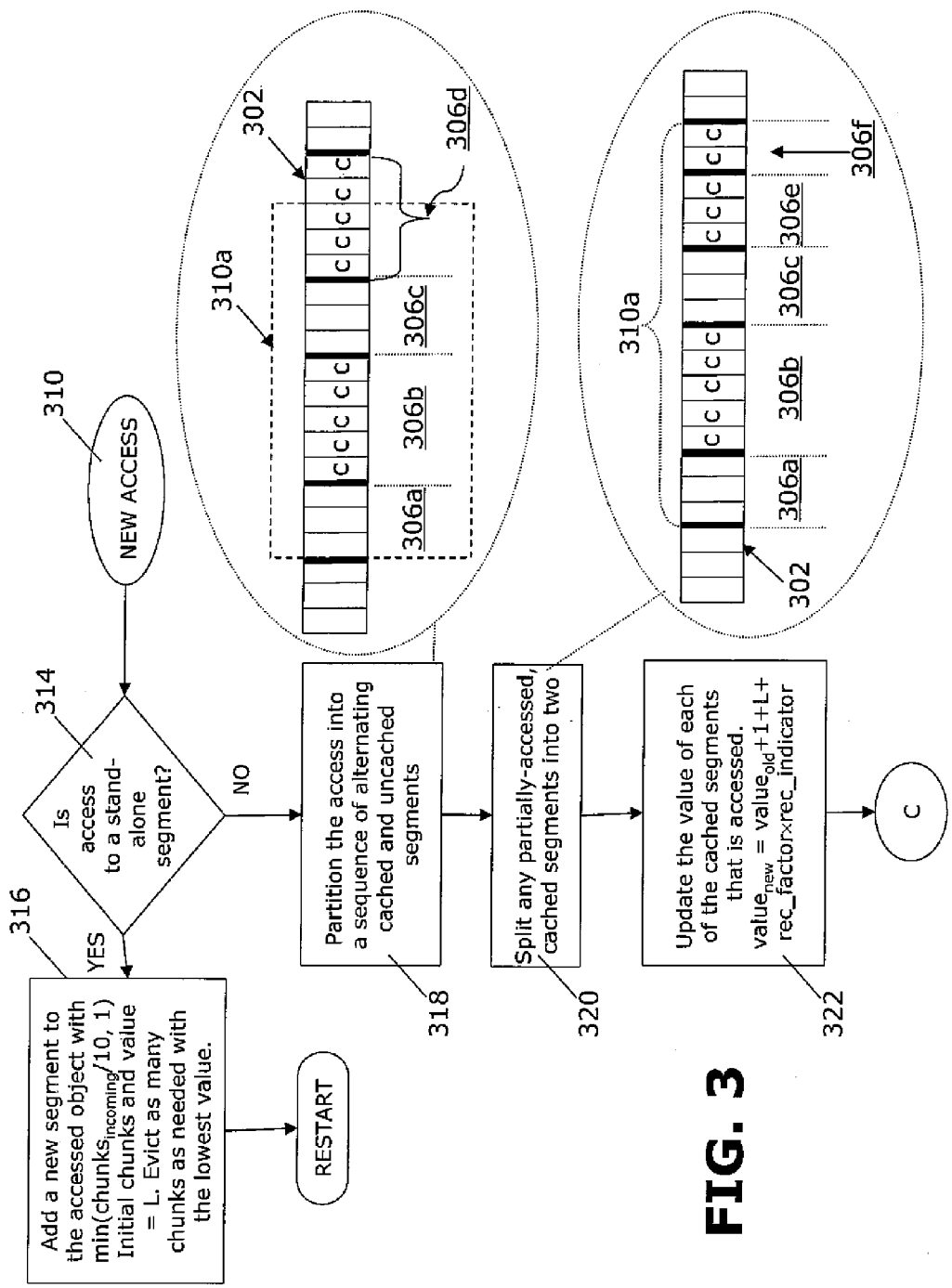
FIGS. 3 and 4 together illustrate a method for the partial caching of video objects.
Figure 4:
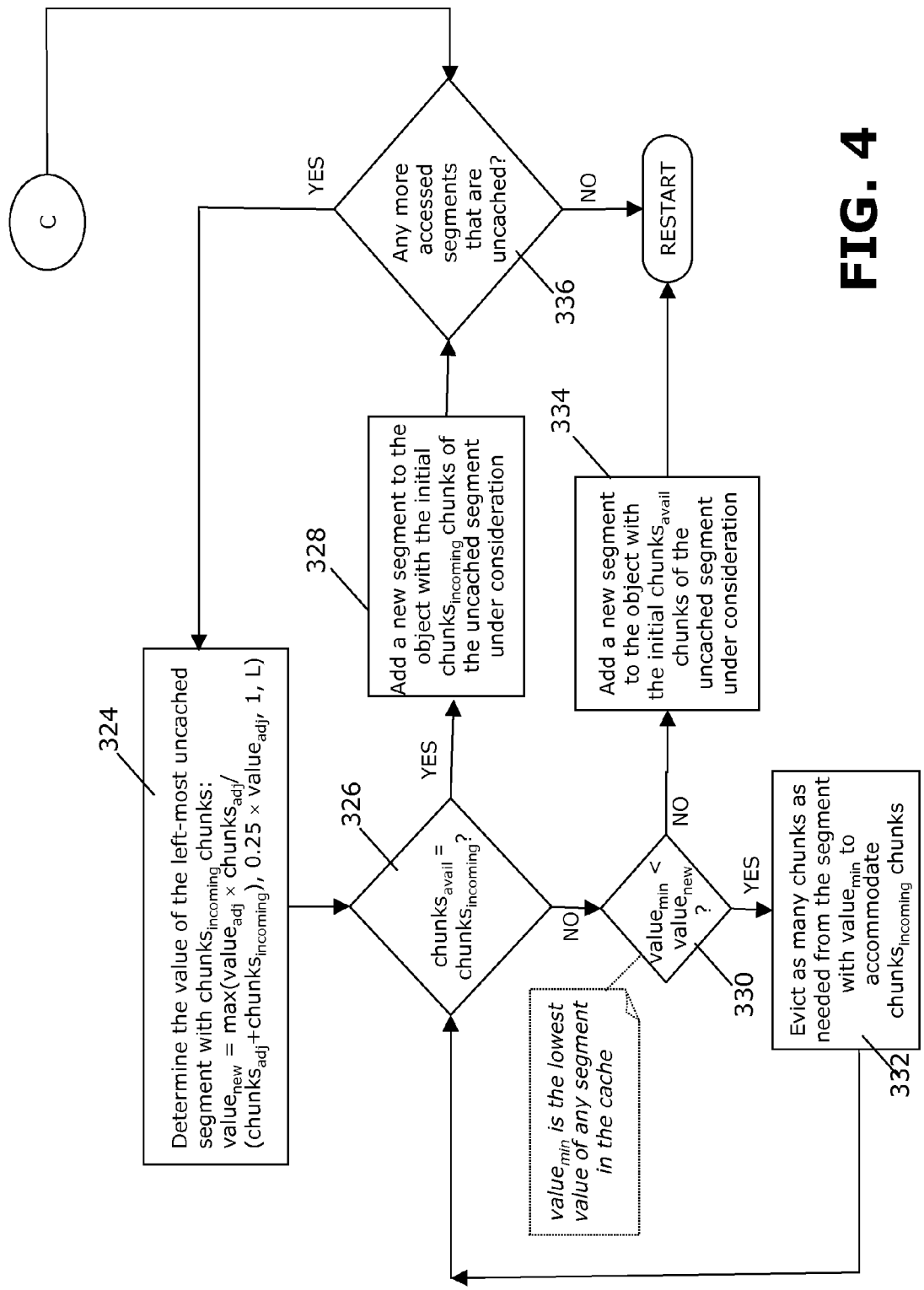

To facilitate easier reference, in advancing from FIG. 1 to and through FIG. 4, a reference numeral is advanced by a multiple of 100 in indicating a substantially similar or analogous component or element with respect to at least one component or element found in at least one earlier figure among FIGS. 2-4.

Broadly contemplated herein, in accordance with at least one embodiment of the invention, are systems and methods for caching large video objects partially in order to increase the cumulative hit rate of the edge caches and lower traffic through the backhaul and core. As such, it can be appreciated that video objects are often very large and, if cached in their entirety, can lead to performance deterioration if incorrect or undesired objects are cached. It can further be appreciated that the number of available videos continues to grow exponentially, and most tend to be viewed only partially. As such, performance can be improved by caching only segments that tend to be popular.

In accordance with at least one embodiment of the invention, it can be recognized that videos may have multiple anchor points, or portions around which viewing is heavy, including anchor points that do not start at the first byte of the video. Such anchor points can include, and by no means are limited to, soft links to videos that specify starting points explicitly but separately (e.g., in text that accompanies the video), and hard links in which the starting offsets are embedded within URLs. Furthermore, the anchor points may not be pre-specified and hence not known a priori (ahead of time), while at best they may only be approximate, to be discerned based on user accesses. Accordingly, caching a prefix of the video does not always work. As such, methods and arrangements are broadly contemplated herein in which anchor points are easily identifiable and readily employed in selectively caching video segments in a meaningful manner while avoiding system overuse.

In accordance with at least one embodiment of the invention, a list is maintained of one or more segments for each cached object. Each segment is associated with a value (which may be based on the frequency and/or recency of accesses), which is used in determining the lengths and values of new abutting segments added for the object in the cache. The value is also used in identifying candidates for eviction when the cache runs short of storage, while segment merge and deferred segment split can also be employed to lower overhead.

By way of introducing basic principles for further appreciating aspects of embodiments of the invention, shown in FIG. 1 is a video object 102 and constituent divisions, which include chunks 104 and segments 106. Accordingly, a chunk 104 is a basic unit of video object 102, and, at least for purposes of the present discussion and example, it may be assumed that a video object is sliced into equally sized (in terms of bytes) discrete chunks. (It should be understood that chunks of equivalent size, in terms of bytes, may not translate to chunks of uniform lengths of time, since bit-rates of a video can vary with time. In the present, non-restrictive example, a chunk may be assumed to not exceed about thirty seconds in terms of time.) A segment 106, on the other hand, is a sequence of contiguous chunks 104; here, two segments 106 are highlighted and have 6 chunks and 14 chunks, respectively. A cached object may have one or more segments associated with it.

As such, in further appreciation of embodiments of the invention, it is usually the case conventionally that an assumption is made of a video object 102 being viewed or downloaded from its beginning, and viewed entirely or in part. Typically, then, conventional arrangements involve caching a prefix, or a single segment 106 starting from the first byte of a video object. A corollary assumption is then made that the value or usefulness of a segment 106 decreases the further it is located from the beginning of the video object 102. There can be variation, among different conventional schemes, as to the length of the prefix that is cached the first time, rules for increasing the cached prefix length, a minimum length (in terms of number of chunks 104) by which the prefix can grow. However, in all such schemes, the starting locations of chunks 104 or segments 106 in a stream of a video object 102 are fixed.

Broadly contemplated herein, in accordance with at least one embodiment of the invention, is a basic algorithm for caching for video objects with multiple anchor points and/or anchor points that do not start at the first byte. As such, each segment 106 is associated with a value, and each video object 102 is associated with a set of non-overlapping cached segments; this set can be null. The value of the video object 102 then becomes the smallest of the values of the segments 106. For its part, the value of a segment 106 could be a function of (among other things) frequency, recency, or both.

By way of further illustration of basic concepts in accordance with at least one embodiment of the invention, FIG. 2 shows a video object 202 with a cached segment 206 (here, it includes two chunks by way of example). (Here and elsewhere in the drawings, any chunks that are cached, that is, which belong to a cached segment, are further labeled with a "c".) An incoming new request for access 210 may then span not only cached segment 206 but also an adjoining non-cached segment 212. The non-cached segment 212 thus contains at least one chunk (here, there are five by way of example) and this set of at least one chunk can be referred to here throughout as "$chunks_{incoming}$".

FIGS. 3 and 4 together illustrate a method for the partial caching of video objects, in accordance with at least one embodiment of the invention. As such, a request for access, or "new access" 310 is accommodated. If (314) access is requested to a stand-alone segment of the video object, then a (configurable) fraction of it, starting from the first chunk requested, is cached (316) according to the following formula:

$$chunks_{new} = \min(1, chunks_{incoming}/10),$$

where $chunks_{new}$ represents the number of chunks to be newly cached, "new" as a subscript generally refers to a newly cached segment and $chunks_{incoming}$ represents the number of chunks accounted for by the request. (The constant 10 in the above expression and elsewhere herein is provided merely as an illustrative and non-restrictive example; it indeed may be replaced by a essentially any suitable value customized for the application at hand.) Essentially, since the popularity of an object/segment is not known, the algorithm avoids over-committing storage for it. The value of the cached segment is then determined as follows:

$$value_{new} = L$$

Here, L is an aging factor which is initialized to 0, and is updated each time a segment is evicted, as described in more detail further below.

In accordance with at least one embodiment of the invention, for subsequent (or non-stand-alone) requests, assuming that a request for access spans a at least one of one or more cached segments and one or more segments that extend a cached segment or immediately precede it (e.g., as shown with the request 210 in FIG. 2), then the new access 310a is partitioned (318) into a sequence of alternating cached and uncached segments. As shown, such a sequence with respect to a video object 302 can include uncached, cached and uncached segments 306a/b/c, respectively. For a request 310a that spans a part of a cached segment, as shown with segment 306d, the segment is split (320) into two smaller segments (306e, 306f).

In accordance with at least one embodiment of the invention, the value of each cached segment within the access 310a (e.g., 306b, 306e) is updated (322):

$$\text{e.g., } value_{new} = value_{old} + 1 + L + rec\_factor \times rec\_indicator.$$

The above expression is one example of updating segment values as a function of frequency and recency. Here, rec_indicator can be any indicator of recency, e.g., the current request number, and rec_factor, as a weight, can be based on the relative importance between recency and frequency in the setting in which the cache is deployed. By way of an illustrative example, values of 0.001 or lower can be recommended for rec_factor.

Accordingly, the value of an uncached extension or preceding segment (e.g., 306c or 306a) is determined (324) and is based on the value of the adjoining cached segment (to the left or right, respectively):

$$value_{new} = \text{maximum of } (value_{adj} \times chunks_{adj}/(chunks_{adj} + chunks_{incoming}), 0.25 \times value_{adj}, 1, L)$$

In the above expression, $value_{adj}$ and $chunks_{adj}$ denote the value and number of chunks in the adjoining segment (that is already cached) to the left of the incoming uncached segment. If the incoming uncached segment does not have a left adjoining segment in the cache, then $value_{adj}$ and $chunks_{adj}$ denote the value and number of chunks in the adjoining right segment. $Value_{new}$ denotes the value to be assigned to the uncached extension/preceding segment that is to be stored in the cache. Accordingly, the fewer the chunks in the incoming segment (i.e., the segment that is part of the incoming request and being considered), the higher the value of the segment.

Next, in accordance with at least one embodiment of the invention, the number of chunks to cache for the new segment is based on the value assigned (in the above step) and the number of chunks with smaller value, and the amount of free cache space. Thus, if (326)

$$chunks_{avail} > chunks_{incoming},$$

where $chunks_{avail}$ represents the number of chunks available in the cache space, all the incoming chunks (328) are cached, that is, $$chunks_{new} = chunks_{incoming}.$$

(where the $chunks_{new}$ refers to the number of chunks in a new segment to be added to the object (as an extension of/preceding segment to a segment already in cache) is to contain). Else, cache incoming chunks in limited manner (330), starting with the first chunk of the segment under consideration, such that:

$$chunks_{new} = \min(chunks_{incoming}, chunks_{avail} + \text{number of chunks with value less than } value_{new})$$

It should be appreciated that the stage contemplated by the above equation (steps 330 and 332) is reached only if $chunks_{incoming}$ exceeds available space. (If equal to available space, then the test in step 326 would pass and the process moves to step 328.) The equation (steps 328/330), then, implies that as many chunks as needed with value less than $value_{new}$ should be evicted. Accordingly, if there is not sufficient cache space for $chunks_{new}$ chunks, the requisite number of chunks (332) should be evicted, while ensuring that chunks are not evicted from the current object or an object in use. As such, if the segment requested is stand-alone, as many chunks as needed of the lowest value to accommodate $chunks_{new}$ chunks are evicted (316). Otherwise (334), only those chunks having a lower value are evicted; thus, L is updated upon every eviction and set $$L = \max(L, \text{value of the segment the evicted chunks belong to})$$

In accordance with at least one embodiment of the invention, if step 328 completes and it is determined (336) that there are any more segments that are uncached, then the process reverts to step 324 as shown.

In accordance with at least one embodiment of the invention, other steps can be taken to reduce general overhead. For instance, search complexity associated with locating a candidate chunk for eviction can be reduced by setting the value of a video object to the lowest value of any of its segments. Then, in a two-step search, the object with the lowest value is located first, then the segment with the lowest value in the object with lowest-value is located. To reduce the number of segments maintained per object, a deferred split can be performed in which an object is split only if the values of the newly split parts will differ considerably after splitting (e.g., the ratio of the lower value to the higher value is less than or equal to a predetermined threshold such as 0.85). Since individual values of that sort cannot be tracked until and unless they are split, partial access counts can be maintained, and then employed in deciding whether to split. (In so doing, it is assumed that a ratio based on prior values will be reasonably close to what values would be after a split.)

In another possible measure to reduce overhead, in accordance with at least one embodiment of the invention, segments can be merged. For instance, two adjoining segments could be merged if their values are significantly close (e.g., the ratio of the lower value to the higher value is greater than or equal to a predetermined threshold such as 0.92).

Figure 5:
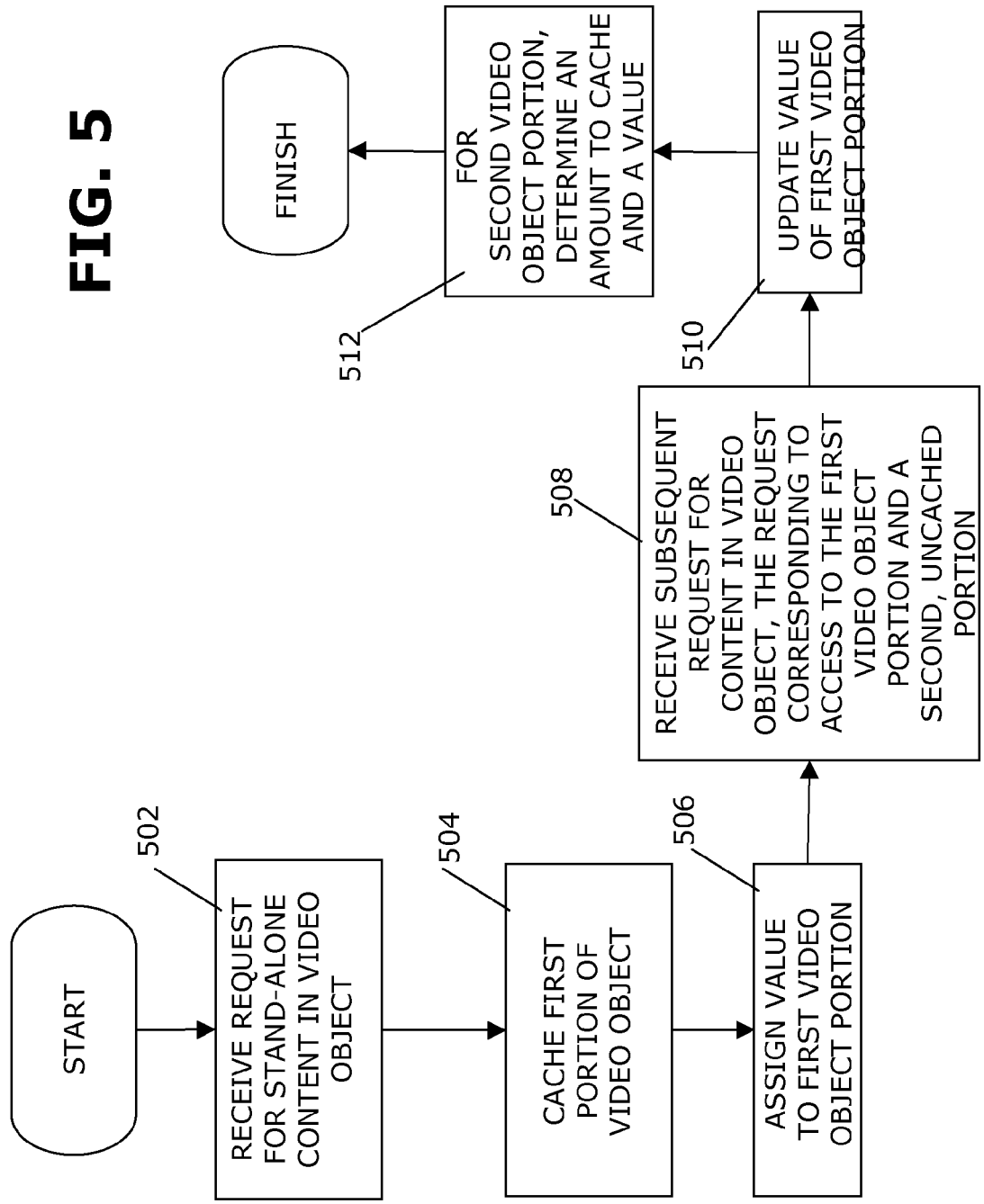
FIG. 5 sets forth a process more generally for caching video object portions.

FIG. 5 sets forth a process more generally for caching video object portions, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way of a processing unit or units and system memory such as those indicated, respectively, at 16' and 28' in FIG. 6.

As shown in FIG. 5, a request for stand-alone content in a video object is received, the content neither being cached nor being adjacent to a cached video object portion (502), and a first portion of the video object is cached (504). A value is assigned to the first video object portion (506). A subsequent request for content in the video object is received, the subsequent request corresponding to access to the first video object portion and a second, uncached portion of the video object (508). The value of the first video object portion is updated (510). For the second video object portion, an amount to cache and a value are determined (512).

Figure 6:
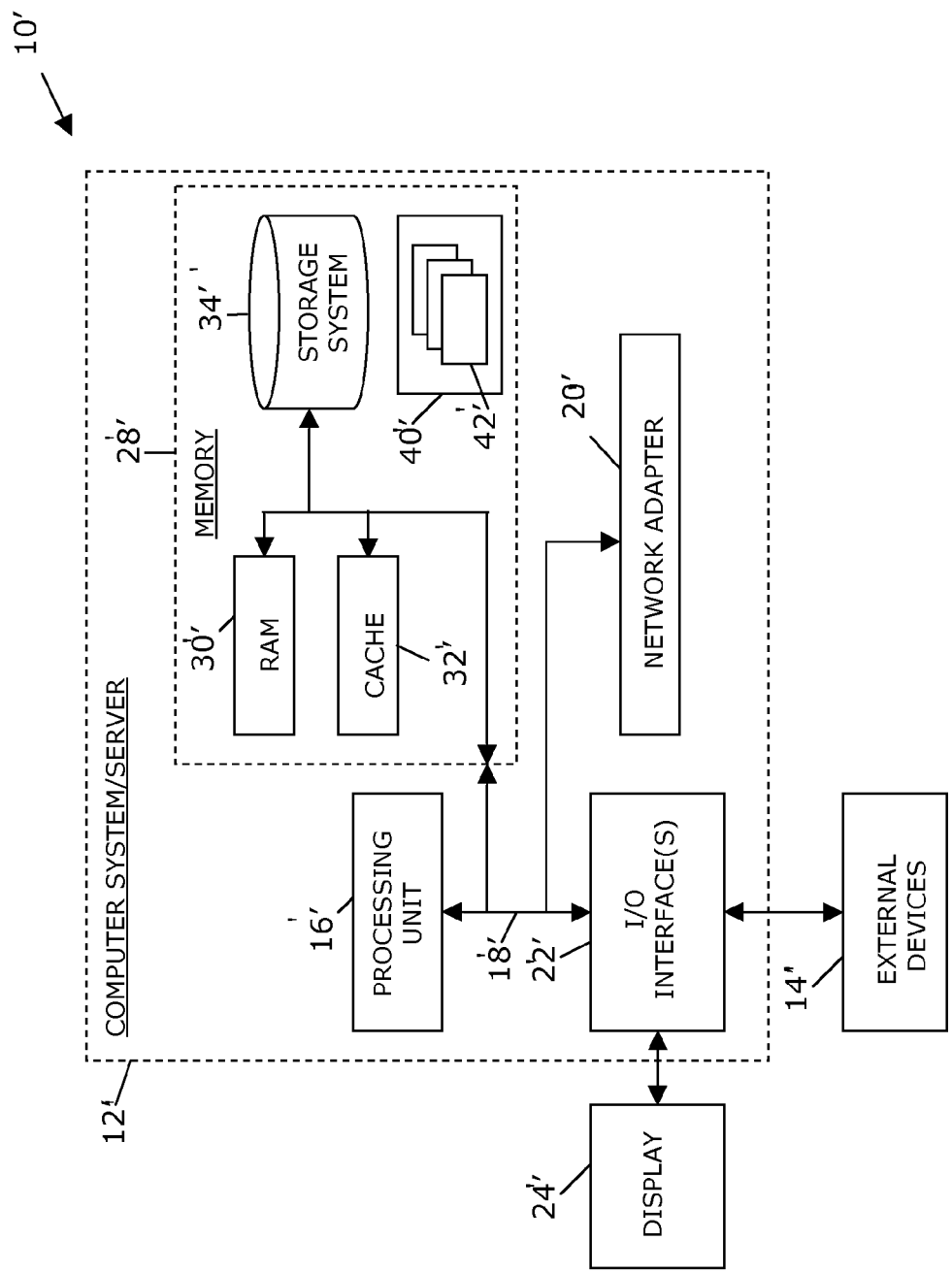
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   at least one processor; and
   a non-transitory computer readable storage medium having computer readable program code embodied therewith and executable by the at least one processor, the computer readable program code comprising:
   computer readable program code configured to receive a request for stand-alone content in a video object, the content neither being cached nor being adjacent to a cached video object portion;
   computer readable program code configured to cache a first portion of the video object;

computer readable program code configured to assign a value to the first video object portion;

computer readable program code configured to receive a subsequent request for content in the video object, the subsequent request corresponding to access to the first video object portion and a second, uncached portion of the video object; and computer readable program code configured to update the value of the first video object portion; and said computer readable program code being configured to determine, for the second video object portion, an amount to cache and a value;

wherein said computer readable program code is configured to:

ascertain whether content corresponding to the request overlaps with an already cached video object portion;

ascertain content corresponding to the request that partially overlaps an already cached video object portion; and split the already cached video object portion.

2. A computer program product comprising:

a non-transitory computer readable storage medium having computer readable program code embodied therewith, the computer readable program code comprising:

computer readable program code configured to receive a request for stand-alone content in a video object, the content neither being cached nor being adjacent to a cached video object portion;

computer readable program code configured to cache a first portion of the video object;

computer readable program code configured to assign a value to the first video object portion;

computer readable program code configured to receive a subsequent request for content in the video object, the subsequent request corresponding to access to the first video object portion and a second, uncached portion of the video object;

computer readable program code configured to update the value of the first video object portion; and said computer readable program code being configured to determine, for the second video object portion, an amount to cache and a value;

wherein said computer readable program code is configured to:

ascertain whether content corresponding to the request overlaps with an already cached video object portion; and perform at least one of the following sets of steps (a) and (b):

(a) ascertain content corresponding to the request that partially overlaps an already cached video object portion; and split the already cached video object portion; and (b) ascertain content corresponding to the request that does not overlap an already cached video object portion;

delineate sub-segments of the content corresponding to the request; and delineate a sub-segment having an adjoining segment, and caching a portion of the sub-segment so delineated.

3. The computer program product according to claim 2, wherein the determining is governed by at least one taken from the group consisting of: the value of the first video object portion, an amount of available storage, a value of a cached video object portion other than the first video object portion.

4. The computer program product according to claim 2, wherein the determining is governed by a size of the second video object portion.

5. The computer program product according to claim 2, wherein said computer readable program code is configured to:

ascertain content corresponding to the request that fully overlaps an already cached video object portion; and update an assigned value of the already cached video object portion.

6. The computer program product according to claim 2, wherein said computer readable program code is configured to:

perform the set of steps (a); and split responsive to a value comparison between prospective split portions of the already cached video object portion.

7. The computer program product according to claim 2, wherein said computer readable program code is configured to delineate a standalone sub-segment and caching a portion of the standalone sub-segment.

8. The computer program product according to claim 2, wherein said computer readable program code is further configured to merge two portions of the video object in cache responsive to a comparison of values of the two portions.

9. The computer program product according to claim 2, wherein said computer readable program code is further configured to evict a portion of the video object in cache responsive to a comparison of values of portions of the video object and to a received request for content in which a size of the content exceeds available cache space.

10. An apparatus comprising:

at least one processor; and a non-transitory computer readable storage medium having computer readable program code embodied therewith and executable by the at least one processor, the computer readable program code comprising:

computer readable program code configured to receive a request for stand-alone content in a video object, the content neither being cached nor being adjacent to a cached video object portion;

computer readable program code configured to cache a first portion of the video object;

computer readable program code configured to assign a value to the first video object portion;

computer readable program code configured to receive a subsequent request for content in the video object, the subsequent request corresponding to access to the first video object portion and a second, uncached portion of the video object; and computer readable program code configured to update the value of the first video object portion; and said computer readable program code being configured to determine, for the second video object portion, an amount to cache and a value;

wherein said computer readable program code is configured to:

ascertain whether content corresponding to the request overlaps with an already cached video object portion;

ascertain content corresponding to the request that does not overlap an already cached video object portion;

delineate sub-segments of the content corresponding to the request; and delineate a sub-segment having an adjoining segment, and caching a portion of the sub-segment so delineated.

* * * * *